US 8,779,614 B2

(12) United States Patent
Yarnold et al.

(10) Patent No.: US 8,779,614 B2
(45) Date of Patent: Jul. 15, 2014

(54) POWER GENERATION AT A SUBSEA LOCATION

(75) Inventors: John Yarnold, League City, TX (US); Jason Gandolfi, Rosharon, TX (US); Larry W. Phillips, Angleton, TX (US); Matt W. Niemeyer, League City, TX (US); Javier Cascudo, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 220 days.

(21) Appl. No.: 13/289,081

(22) Filed: Nov. 4, 2011

(65) Prior Publication Data

US 2013/0113213 A1   May 9, 2013

(51) Int. Cl.
F03D 9/00 (2006.01)

(52) U.S. Cl.
USPC ............................................................ 290/54

(58) Field of Classification Search
USPC .................................................... 290/54–55
See application file for complete search history.

(56) References Cited

U.S. PATENT DOCUMENTS

| | | | |
|---|---|---|---|
| 5,839,508 A | 11/1998 | Tubel | |
| 6,998,724 B2 | 2/2006 | Johansen | |
| 7,069,998 B2 | 7/2006 | Zhang et al. | |
| 7,096,955 B2 | 8/2006 | Zhang et al. | |
| 7,224,080 B2* | 5/2007 | Smedstad | 290/43 |
| 7,234,524 B2 | 6/2007 | Shaw et al. | |
| 7,239,037 B2* | 7/2007 | Alstot et al. | 290/54 |
| 7,926,438 B2 | 4/2011 | Guerrero et al. | |
| 8,056,619 B2 | 11/2011 | Patel et al. | |
| 2006/0006657 A1* | 1/2006 | Alstot et al. | 290/54 |
| 2007/0295504 A1 | 12/2007 | Patel | |
| 2008/0260548 A1* | 10/2008 | Ahdoot | 417/333 |
| 2009/0096214 A1* | 4/2009 | Sternitzke | 290/53 |
| 2009/0114140 A1 | 5/2009 | Guerrero | |
| 2009/0151954 A1 | 6/2009 | Krehbiel | |
| 2009/0166045 A1 | 7/2009 | Wetzel et al. | |
| 2010/0025043 A1* | 2/2010 | Ingebrigtsen et al. | 166/339 |
| 2010/0181067 A1 | 7/2010 | Chen et al. | |
| 2010/0244451 A1* | 9/2010 | Ahdoot | 290/53 |
| 2011/0084490 A1 | 4/2011 | Knox | |
| 2011/0143175 A1 | 6/2011 | Vyas et al. | |
| 2011/0155396 A1 | 6/2011 | Pinard et al. | |
| 2011/0232912 A1 | 9/2011 | Close | |
| 2011/0260460 A1* | 10/2011 | Rovinsky | 290/54 |
| 2012/0001482 A1 | 1/2012 | Burdick | |
| 2012/0067567 A1 | 3/2012 | Rytlewski et al. | |

FOREIGN PATENT DOCUMENTS

| | | |
|---|---|---|
| EP | 2336483 A2 | 6/2011 |
| WO | 2005078233 A1 | 8/2005 |
| WO | 2010083210 A1 | 7/2010 |

* cited by examiner

*Primary Examiner* — Truc Nguyen
(74) *Attorney, Agent, or Firm* — Jeffrey R. Peterson; Brandon S. Clark

(57) ABSTRACT

A technique facilitates powering of devices at a subsea location without requiring routing of hydraulic pressure and/or electric signals through an umbilical from a surface location. A fluid flow, such as an injection chemical fluid flow, is at least partially routed through a flow converter disposed at a subsea location. The flow converter converts energy from the fluid flow to energy used to operate a power generation device. The power generation device may be designed to generate electrical, hydraulic, or other suitable power which is utilized at the subsea location.

20 Claims, 4 Drawing Sheets

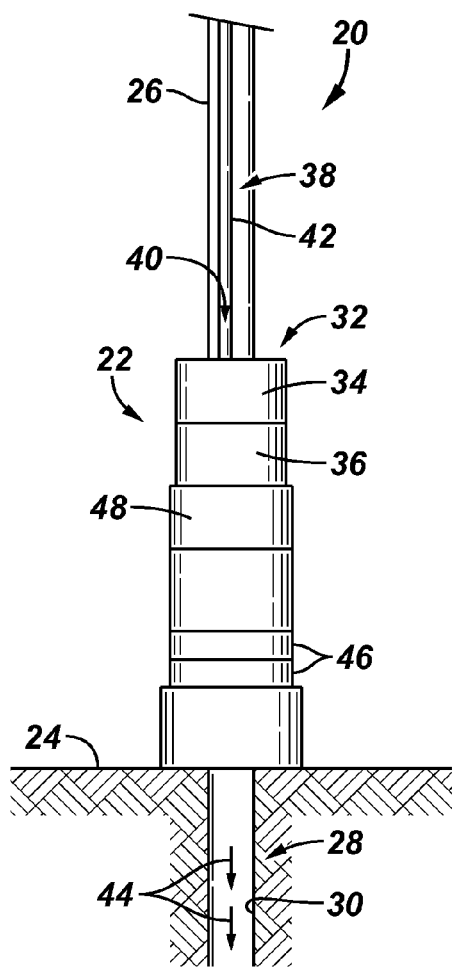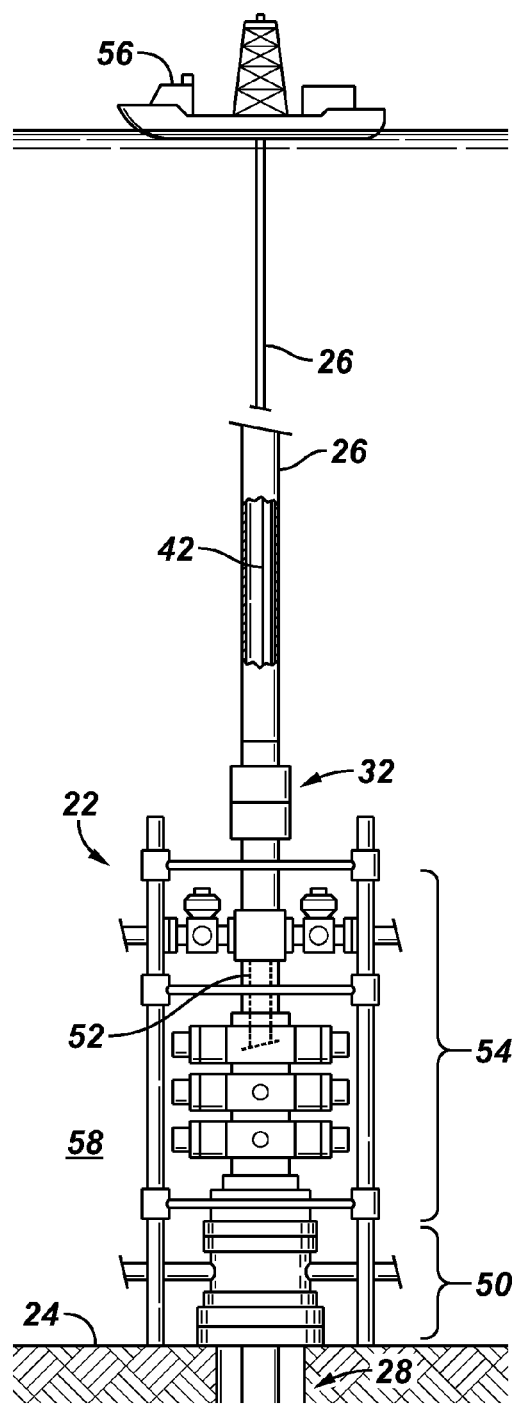

POWER GENERATION AT A SUBSEA LOCATION

BACKGROUND

Well testing projects, completion projects and intervention projects in the offshore environment utilize a subsea test tree which is placed in a blowout preventer stack on the seafloor. This type of landing string permits well flow control while also enabling rapid disconnect of the wellhead from a dynamically positioned or anchored vessel. Valves in the subsea test tree are actuated using electrical signals from the vessel to operate solenoids which control flow of hydraulic fluid for positioning the valves. The hydraulic pressure and electrical signals for controlling the system are supplied from the vessel using an umbilical which extends down to the subsea test tree.

SUMMARY

In general, the present disclosure provides a system and method which do not require the routing of hydraulic pressure and/or electric signals through an umbilical from a surface location. A fluid flow, such as an injection chemical fluid flow, is at least partially routed through a flow converter disposed at a subsea location. The flow converter converts energy from the fluid flow to energy used to operate a power generation device. The power generation device may be designed to generate electrical and/or hydraulic power which is utilized at the subsea location.

BRIEF DESCRIPTION OF THE DRAWINGS

Certain embodiments will hereafter be described with reference to the accompanying drawings, wherein like reference numerals denote like elements. It should be understood, however, that the accompanying figures illustrate only the various implementations described herein and are not meant to limit the scope of various technologies described herein, and:

FIG. 1 is a schematic illustration of an example of a subsea system employing a subsea power unit to generate power at a subsea location, according to an embodiment of the disclosure;

FIG. 2 is an illustration of another example of a subsea system utilizing a subsea test tree deployed in a blowout preventer stack, according to an embodiment of the disclosure;

DETAILED DESCRIPTION

Figure 3:
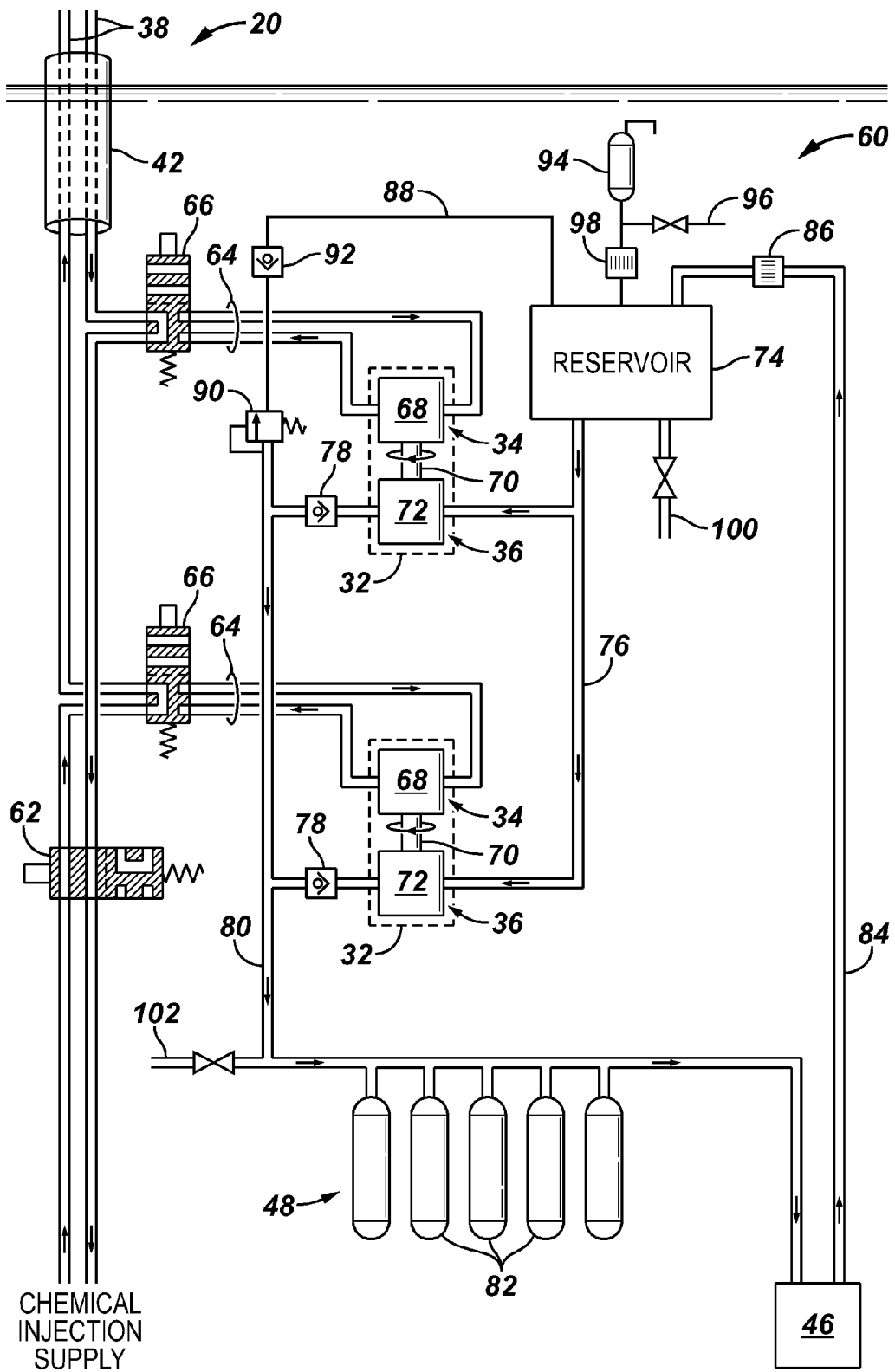
FIG. 3 is a diagram of a subsea system utilizing fluid flow to generate and store hydraulic power at a subsea location, according to an embodiment of the disclosure.

In the following description, numerous details are set forth to provide an understanding of some illustrative embodiments of the present disclosure. However, it will be understood by those of ordinary skill in the art that the system and/or methodology may be practiced without these details and that numerous variations or modifications from the described embodiments may be possible.

The disclosure herein generally relates to a system and methodology which enable power generation at subsea locations, such as subsea locations associated with subsea wells. According to an embodiment of the disclosure, a subsea fluid flow is routed through a subsea power unit comprising a flow converter unit. The flow converter unit converts energy of the flowing fluid into a form able to drive a power generation unit which, in turn, provides a desirable form of energy for powering subsea devices. The power generation unit also may be coupled to a power storage unit designed to store energy for subsequent use by the powered subsea devices.

In some applications, fluid flow is delivered to a subsea facility via a conduit, such as an umbilical, and at least a portion of the fluid flow is routed through the flow converter unit. In some well related applications, the fluid flow comprises a flow of chemical injection fluid which is routed from a surface location to a subsea facility, such as a subsea tree located on a seafloor. The chemical injection fluid is used in performing an injection process but at least a portion of the flowing chemical injection fluid is directed through the flow converter unit.

In a chemical injection application, the chemical injection process may utilize a variety of chemicals to enhance the subsea well. For example, chemical solutions may be used to improve oil recovery, to remove formation damage, to clean blocked perforations or formation layers, to reduce or inhibit corrosion, to upgrade crude oil, and/or to address crude oil flow-assurance issues. Chemical injection may be administered continuously or in batches in injection wells or, at times, in production wells. The chemicals may be supplied from a surface location, e.g. from a surface vessel, and pumped through a subsea test tree using a conduit, such as an umbilical. An example of a chemical employed in fluid form for injection processes is methanol although other chemicals and/or combinations of chemicals may be used to improve the well.

Referring generally to FIG. 1, an example of one type of application for providing power at a subsea location is illustrated. The example is provided to facilitate explanation, and it should be understood that a variety of power generating systems may be used in a variety of well related subsea applications as well as in many types of subsea, non-well related applications in which it is desirable to provide power at a subsea location without routing power conduits, e.g. electrical or hydraulic conduits, from a surface location. The subsea facility and other structures described herein may comprise many types of components arranged in various configurations depending on the parameters of a specific subsea application.

In FIG. 1, an embodiment of a subsea system 20 is illustrated as comprising a subsea facility 22 positioned at a desired subsea location 24, such as a seafloor. The subsea system 20 also may comprise a riser or other structure 26 extending from the subsea facility 22 to, for example, a surface location. In the example illustrated, subsea facility 22 is positioned over a subsea well 28 having at least one wellbore 30 to help control various operations with respect to well 28. However, other types of subsea facilities 22 may be used in well related and non-well related applications. In well related applications, well 28 may comprise many types of wellbores, including deviated, e.g. horizontal, single bore, multilateral, cased, and uncased (open bore) wellbores.

Referring again to FIG. 1, the illustrated subsea facility 22 comprises a subsea power unit 32 having a flow converter unit 34 and a power generation unit 36. A fluid flow is used to power the flow converter unit 34 which, in turn, converts energy in the flowing fluid to a suitable form for operating the power generation unit 36. By way of example, flow converter unit 34 comprises a turbine or a fluid operated motor which converts the flowing fluid to rotational motion. The rotational motion is used to drive the power generation unit 36 which may be in the form of a hydraulic pump and/or electrical generator, as described in greater detail below. The fluid flow to subsea power unit 32 is provided by a conduit 38 having a flow passage 40. In a variety of subsea applications, the conduit 38 may be in the form of an umbilical 42 routed from, for example, a surface location to the subsea facility 22. In some embodiments, the umbilical 42 also may be used to deliver chemical injection fluid to subsea facility 22 and on into well 28, as indicated by arrows 44.

The power generated via power generation unit 36 at the subsea location 24 may be used to provide power for subsea, powered devices 46. By way of example, powered devices 46 comprise hydraulically powered devices and/or electrically powered devices. In some applications, the power generation unit 36 may be used to provide power, e.g. hydraulic and/or electrical power, directly to powered devices 46. However, in other applications, the power generation unit 36 is coupled to a power storage unit 48 which is able to store energy for later use by powered devices 46. The system also may be designed to enable both direct powering of devices 46 via power generation unit 36 and powering of devices 46 via power storage unit 48. Depending on the specific application, many types of powered devices 46 may be employed and examples of powered devices 46 include solenoids, hydraulically actuated valves and sliding sleeves, other types of flow control devices, sensors, and other tools and components operated via hydraulic, electrical, or other suitable power that may be generated at the subsea location by power generation unit 36.

Referring generally to FIG. 2, a specific example of subsea facility 22 is illustrated. In this example, subsea facility 22 comprises a Christmas tree 50 mounted on the seafloor. Above the Christmas tree 50, subsea facility 22 comprises a subsea test tree 52 mounted in a blowout preventer stack 54. Riser 26 extends down to the subsea test tree 52 from a surface vessel 56 and umbilical 42 is located within the riser 26. Chemical injection fluid is directed down through umbilical 42 and is used both to perform a desired chemical injection process in well 28 and to power subsea power unit 32 so as to enable generation of desired hydraulic and/or electrical power at a subsea well location 58.

The chemical injection fluid may be pumped at significant pressures and flow rates during an injection process, and this high-pressure and high flow rate fluid may be used to spin flow converter unit 34, e.g. to spin a fluid driven motor or turbine, which, in turn, operates power generation unit 36, e.g. a hydraulic pump and/or alternator. The power generation unit 36 is thus able to supply hydraulic power and/or electricity to the subsea test tree 52. As a result, a surface installed hydraulic power unit and umbilical with electrical power connectors and hydraulic hose connections is no longer needed to operate the subsea test tree 52.

Referring generally to FIG. 3, an embodiment of a subsea power generation system 60 comprising subsea power unit 32 is illustrated. In the example illustrated, the subsea power generation system 60 comprises a plurality of subsea power units 32, e.g. two subsea power units 32, to provide redundancy. Fluid is supplied to the subsea location 24 via at least one conduit 38 which may be disposed within umbilical 42 or at another suitable location. In the specific example illustrated, a plurality of conduits 38, e.g. two conduits, is used to provide fluid flow for a plurality of the subsea power units 32, e.g. two subsea power units. By using two conduits 38, a closed loop control valve 62 is able to selectively control whether fluid flowing through conduits 38 is allowed to pass for performance of a desired function, e.g. chemical injection, or is simply looped back to the surface to enable operation of the subsea power units 32 without performing an additional function.

In the embodiment illustrated, the subsea power generation system 60 employees a diverter circuit 64 between each subsea power unit 32 and a corresponding conduit 38. Each diverter circuit 64 comprises a diverter valve 66 which may be selectively controlled to block flow of actuating fluid to the corresponding subsea power unit 32 or to allow at least a portion of the fluid flowing along the corresponding conduit 38 to pass through and power the subsea power unit 32. When the diverter valve 66 is open, the diverter circuit 64 directs the fluid flow through the flow converter unit 34 of the corresponding subsea power unit 32 and back to the same conduit 38. In this example, the fluid flowing through conduits 38 may comprise a chemical injection fluid used to perform a chemical injection operation in a subsea facility 22 and/or well 28.

As illustrated, the flow converter unit 34 may comprise a fluid driven motor or turbine 68 which is coupled to power generation unit 36 by, for example, a shaft 70. If the fluid directed through conduits 38 comprises methanol, the fluid driven motor or turbine 68 may comprise a methanol motor or turbine. As the flowing fluid passes through the flow converter unit 34, the energy of the flowing fluid is converted to rotational motion of shaft 70 which drives the power generation unit 36 of each subsea power unit 32. In the specific example illustrated, the power generation unit 36 comprises a hydraulic pump 72.

The hydraulic pump 72 of each subsea power unit 32 receives a hydraulic actuating fluid from a reservoir 74. Reservoir 74 is connected to an intake of each hydraulic pump 72 by a fluid line 76, and each hydraulic pump 72 discharges the hydraulic actuating fluid through a check valve 78 and a discharge line 80. The discharge line 80 may be routed to one or more of the powered devices 46 and/or to power storage unit 48. In the example illustrated, power storage unit 48 comprises at least one and often a plurality of subsea accumulators 82. The subsea accumulators 82 enable build up and storage of hydraulic pressure generated by the hydraulic pump or pumps 72 so that the pressure may be used at a later point in time to actuate the powered device or devices 46. On an opposite side of powered device(s) 46, a return line 84 provides a return path for hydraulic fluid to reservoir 74. In the example illustrated, the fluid returning to reservoir 74 via return line 84 passes through a filter 86.

In this embodiment, the subsea power generation system 60 also may comprise a pressure relief circuit 88 disposed between a discharge end of each hydraulic pump 72 and the reservoir 74. As illustrated, the pressure relief circuit 88 may comprise a relief valve 90 and a check valve 92 located in series with respect to the relief valve 90. Additionally, the reservoir 74 may be coupled to a pressure compensating vent 94 and a fill port 96 across a filter 98. A drain port 100 also may be coupled with reservoir 74. In some applications, an additional fill port 102 may be located proximate accumulators 82 to facilitate filling of the subsea power generation system with hydraulic actuation fluid. It should be noted that the hydraulic actuation fluid is isolated by subsea power generation system 60 from the fluid, e.g. chemical injection fluid, flowing through conduits 38 and diverter circuits 64.

Figure 4:
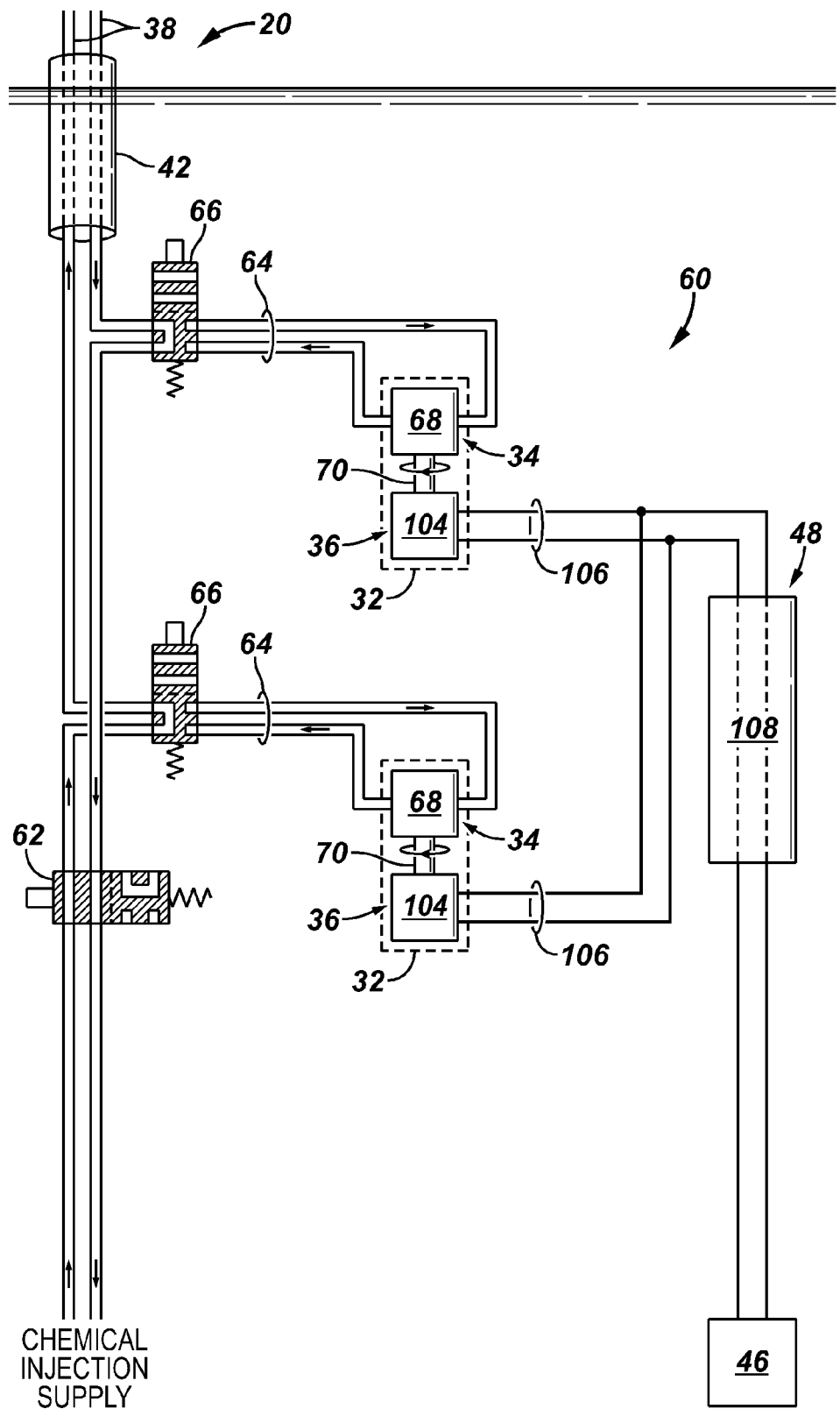
FIG. 4 is a diagram of a subsea system utilizing fluid flow to generate and store electrical power at a subsea location, according to an embodiment of the disclosure.

Referring generally to FIG. 4, another embodiment of subsea power generation system 60 is illustrated. In this embodiment, the same reference numerals have been used to label components that correspond with similar components illustrated and described in the embodiment of FIG. 3. However, the power generation unit 36 in the embodiment of FIG. 4 comprises an electrical generator 104 instead of the hydraulic pump 72. By way of example, the electrical generator 104 may be in the form of an alternator. The flow converter unit 34 may again comprise a fluid powered motor or turbine 68 which drives electrical generator 104 via shaft 70. Although two subsea power units 32 are again illustrated, other applications may utilize a single subsea power unit 32 or additional subsea power units 32.

As each electrical generator 104 is operated by the corresponding flow converter unit 34, electrical energy is generated and a current is output to electric lines 106. The electrical energy may be delivered directly to the electrically powered device or devices 46 and/or electrical energy may be delivered to power storage unit 48. In this example, power storage unit 48 may comprise at least one electrical storage device 108, such as a battery or capacitor. In many applications, the at least one electrical storage device 108 comprises a plurality of batteries or capacitors. The electrical storage device or devices 108 enable build up and storage of electrical energy generated by the electrical generators 104 so that the electrical energy may be used at a later point in time to actuate the powered device or devices 46.

Figure 5:
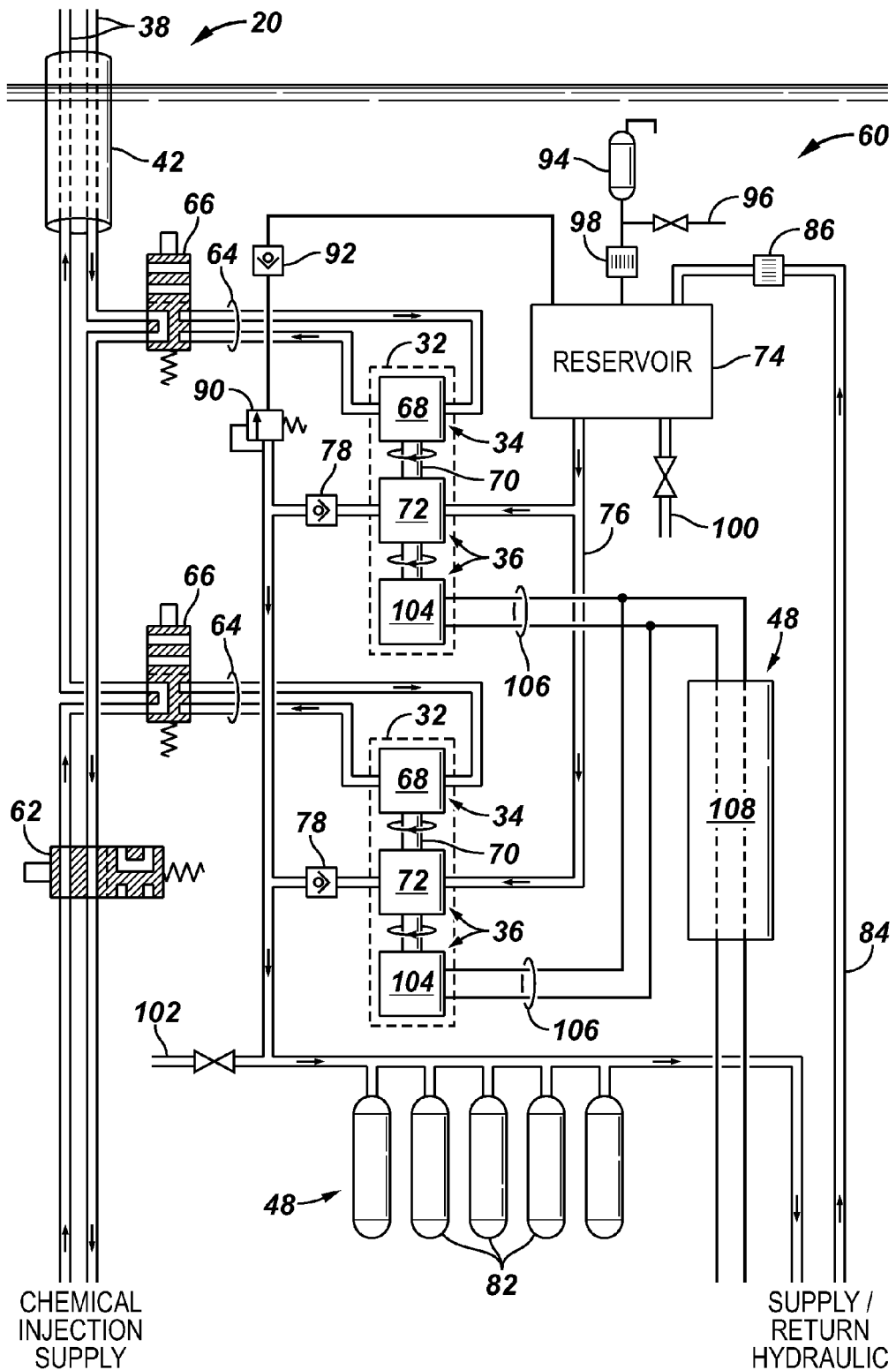
FIG. 5 is a diagram of a subsea system utilizing fluid flow to generate hydraulic power and electrical power at a subsea location, according to an embodiment of the disclosure.

Referring generally to FIG. 5, another embodiment of subsea power generation system 60 is illustrated. In this embodiment, the same reference numerals have been used to label components that correspond with similar components illustrated and described in the embodiments of FIG. 3 and FIG. 4. However, the power generation unit 36 comprises both a hydraulic pump 72 and an electrical generator 104 to create both hydraulic pressure energy and electrical energy for use by corresponding powered devices 46 at the subsea location.

In the example illustrated in FIG. 5, the flow converter unit 44 of each subsea power unit 32 is designed to power both the hydraulic pump 72 and the electrical generator 104 via, for example, a single shaft or a plurality of shafts 70. The pressurized fluid and/or electrical current output by the hydraulic pump 72 and electrical generator 104, respectively, can be provided directly to powered devices 46 or the energy may be stored. In this example, the power storage unit 48 comprises both subsea accumulators 82 and electrical storage devices 108 which provide both hydraulic pressure and electrical power for use in actuating powered devices 46 at a later point in time. The subsea power generation system 60 comprises a combination of the hydraulic circuits, reservoir, control valves, and electrical lines described in the embodiments of FIG. 3 and FIG. 4.

The system and methodology described herein may be employed in non-well related applications which utilize subsea tools actuated by, for example, hydraulic and/or electrical power. The subsea power unit or units may be powered by a variety of fluid flows along umbilical flow passages or along other types of conduits routed to the subsea location of interest. Similarly, the system and methodology may be employed in many types of well applications, including many types of chemical injection applications in which a chemical fluid treatment is directed down through an umbilical or other conduit to a subsea facility for injection into a subsea well. At least a portion of the flowing chemical fluid treatment is diverted to power the flow converter unit of each subsea power unit. In some applications, each subsea power unit may be powered by flowing fluid even when chemical injection treatments are not being performed. For example, a closed loop control valve may be actuated, as described above, to redirect the flowing fluid through a subsea loop which includes passage through each flow converter unit. It should further be noted that the number and the type of subsea power units, hydraulic circuits, valves, electrical circuits, power storage units, conduits/umbilicals, subsea facilities, and other components or configurations of the overall system may be adjusted for a variety of applications and environments.

Although only a few embodiments of the system and methodology have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for providing power at a subsea location, comprising:
coupling an umbilical with a subsea facility;
delivering a chemical injection fluid through the umbilical from a surface location to the subsea facility;
diverting at least a portion of the chemical injection fluid through a subsea flow converter unit which converts the flowing fluid to rotational motion;
injecting at least a portion of the chemical injection fluid into a subsea well; and
using the subsea flow converter unit to drive a power generation unit able to generate energy for use at the subsea facility.

2. The method as recited in claim 1, wherein delivering comprises delivering methanol.

3. The method as recited in claim 1, wherein coupling comprises coupling the umbilical to a subsea tree.

4. The method as recited in claim 1, wherein diverting comprises diverting at least the portion of chemical injection fluid through the subsea flow converter unit in the form of a turbine.

5. The method as recited in claim 1, wherein diverting comprises diverting at least the portion of chemical injection fluid through the subsea flow converter unit in the form of a fluid driven motor.

6. The method as recited in claim 1, wherein using comprises using the subsea flow converter unit to drive the power generation unit in the form of a hydraulic pump.

7. The method as recited in claim 6, further comprising using the hydraulic pump to build hydraulic pressure; and storing the hydraulic pressure in a subsea accumulator.

8. The method as recited in claim 1, wherein using comprises using the subsea flow converter unit to drive the power generation unit in the form of an electrical generator.

9. The method as recited in claim 8, further comprising using the electrical generator to generate electricity; and storing the electrical energy in an energy storage device.

10. The method as recited in claim 1, further comprising powering devices at the subsea facility with the energy provided by the power generation unit.

11. A system for providing power at a subsea location, comprising:
a subsea facility positioned at a seafloor and over a subsea well;
a conduit extending from a surface location to the subsea facility, the conduit comprising a flow passage for carrying a fluid;
a flow converter unit coupled to the conduit, the flow converter unit being powered by flow of at least a portion of the fluid;
a power generation unit coupled to the flow converter unit, the power generation unit being positioned at a subsea location; and
a subsea energy storage unit positioned at the subsea location to store energy output by the power generation unit.

12. The system as recited in claim 11, wherein the conduit comprises an umbilical.

13. The system as recited in claim 11, wherein the power generation unit comprises a hydraulic pump.

14. The system as recited in claim 11, wherein the power generation unit comprises an electrical generator.

15. The system as recited in claim 11, wherein the power generation unit comprises a hydraulic pump and an electrical generator.

16. The system as recited in claim 13, wherein the subsea energy storage unit comprises a plurality of hydraulic pressure accumulators.

17. The system as recited in claim 14, wherein the subsea energy storage unit comprises a battery.

18. A method, comprising:
routing a conduit to a subsea location;
coupling a flow converter unit to the conduit at the subsea location with a diverter circuit which diverts a portion of a fluid flowing through the conduit to the flow converter unit to create rotational motion;
injecting at least a portion of the fluid into a subsea well to help control an operation performed with respect to the subsea well; and
using the rotational motion output by the flow converter unit to power a power generation unit.

19. The method as recited in claim 18, further comprising outputting hydraulic power from the power generation unit.

20. The method as recited in claim 18, further comprising outputting electrical power from the power generation unit.

\* \* \* \* \*